United States Patent [19]

Ouchi et al.

[11] Patent Number: 5,796,577

[45] Date of Patent: Aug. 18, 1998

[54] NOTEBOOK COMPUTER WITH TWO DISPLAYS

[75] Inventors: Genjiro Ouchi; Nobuhiko Akinaga; Kazuyuki Ogata, all of Yokohama, Japan

[73] Assignee: Hitachi Electronics Services Co., Ltd., Yokohama, Japan

[21] Appl. No.: 895,220

[22] Filed: Jul. 16, 1997

[30] Foreign Application Priority Data

Jan. 21, 1997 [JP] Japan .................. 9-008363

[51] Int. Cl.⁶ .................. G06F 1/16; H05K 5/03
[52] U.S. Cl. .................. 361/68.1
[58] Field of Search .................. 361/681, 682, 361/683; 345/168, 169, 905; 248/917–923; 364/708.1; G06F 1/16

[56] References Cited

U.S. PATENT DOCUMENTS 5,594,620  1/1997  Register .................. 361/681
5,673,170  9/1997  Register .................. 361/681

*Primary Examiner*—Lynn D. Feild
*Attorney, Agent, or Firm*—Fildes & Outland, P.C.

[57] ABSTRACT

The notebook computer 1 comprises a keyboard 2 positioned on the upper surface of a computer body 10, an operating ball 22, function keys 24 and the like. A cover member fixed to the computer body 10 by a hinge 40 so that it opens and closes against the computer body is supported in an open position substantially perpendicular to the body 10. A first display device 60 is formed on the inner surface of the cover member 50, and a second display device 70 is formed on the outer surface thereof. The operator and the client facing each other with the notebook computer positioned between them could share the same screen information by watching each of the two display devices in front of them.

2 Claims, 3 Drawing Sheets

NOTEBOOK COMPUTER WITH TWO DISPLAYS

TECHNICAL FIELD OF THE INVENTION

This invention relates to a display device of a personal computer and the like, and more particularly to a display device having two screens, one placed facing the operator and one placed facing the client positioned opposing the operator using the personal computer.

BACKGROUND OF THE INVENTION

The display method of the prior art personal computers had only one screen, so the operator had to operate the computer from the front side of the screen.

Therefore, when the computer was used for sales or educational means, the audience had a hard time watching the screen from the sides of the display device.

Further, when the computer is used as sales means, the whole screen would be seen not only by the operator but by the audience or client, so the information which is not preferred to be seen by the client could not be displayed.

SUMMARY OF THE INVENTION

The present invention provides a notebook computer wherein the screen could be shared by the user and the client facing eachother in an opposing state.

The notebook computer of the present invention comprises of a notebook computer body having a keyboard, a cover member formed to open and close against the computer body by a hinge, a first display device placed on the inside surface of the cover, and a second display device placed on the outside surface of the cover. The first display device and the second display device will show the same information.

DETAILED DESCRIPTION

Figure 1:
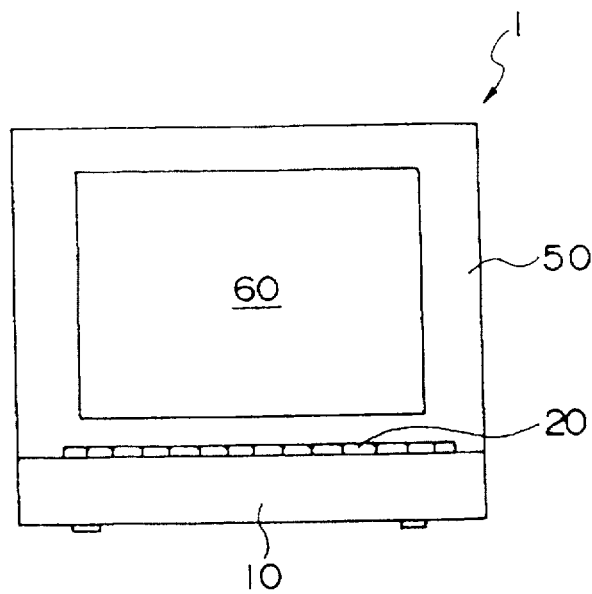
FIG. 1 is a front view of the notebook computer of the present invention.
Figure 2:
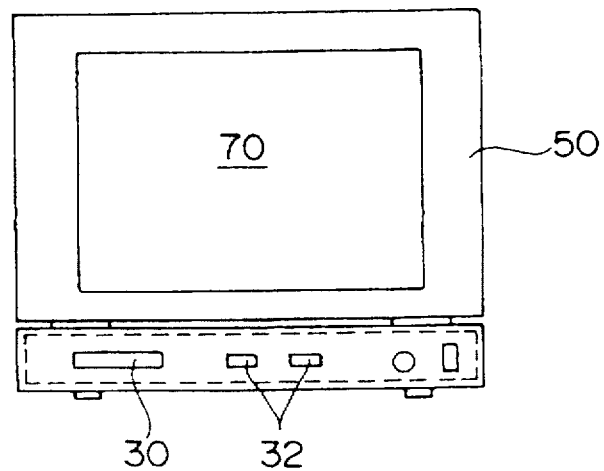
FIG. 2 is a back view of the notebook computer of the present invention.
Figure 3:
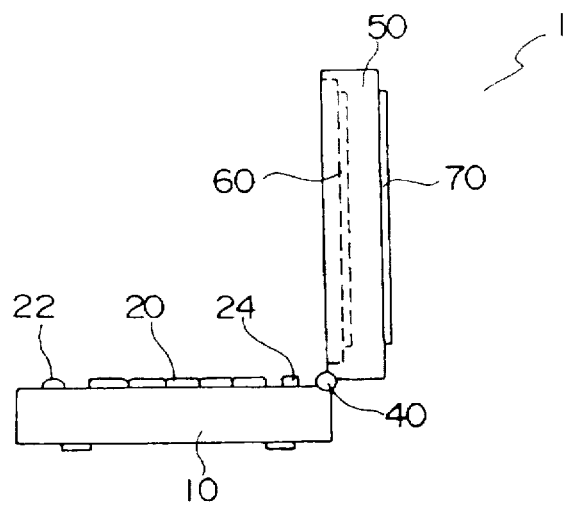
FIG. 3 is a right side view of the notebook computer of the present invention.
Figure 4:
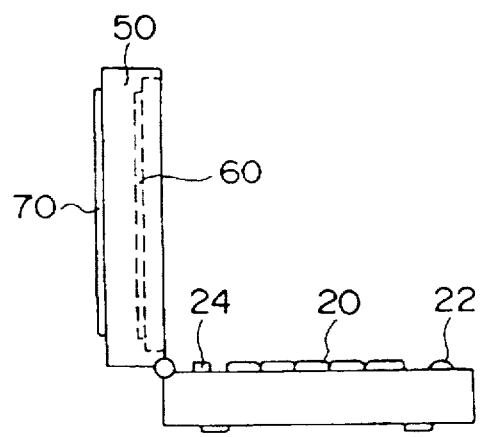
FIG. 4 is a left side view of the notebook computer of the present invention.
Figure 5:
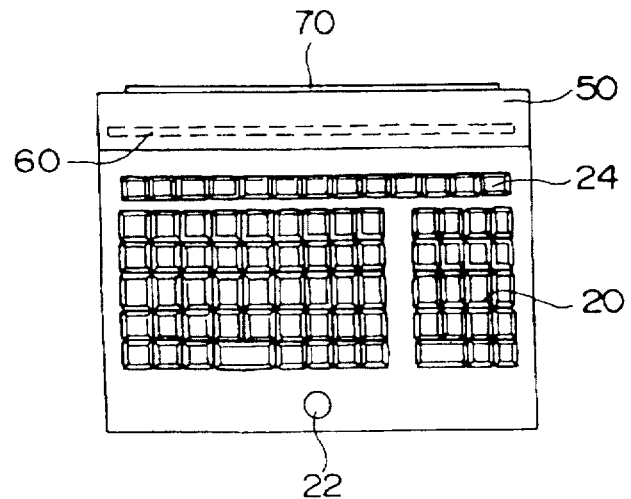
FIG. 5 is a plan view of the notebook computer of the present invention.
Figure 6:
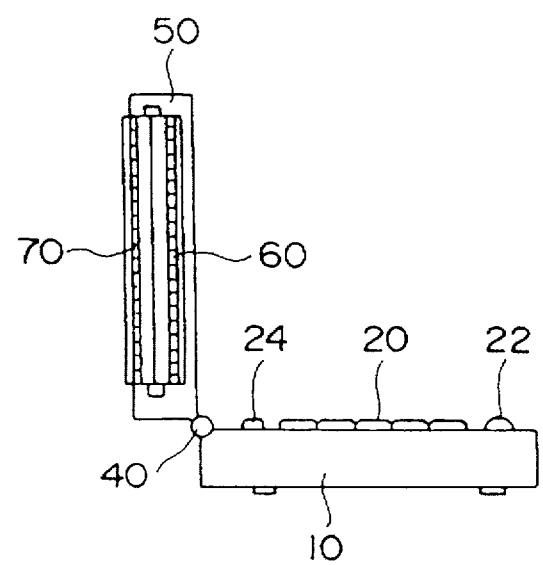
FIG. 6 is a partially cross-sectional left side view of the notebook computer of the present invention showing the display portion.

FIG. 1 is a front view of the notebook computer having the display device of the present invention, FIG. 2 is a rear view, FIG. 3 is a right side view, FIG. 4 is a left side view, FIG. 5 is a plan view and FIG. 6 is a left side view showing the display portion in cross-section.

The notebook computer 1 comprises of a personal computer body 10 and a cover member 50 fixed to open and close against the personal computer body 10 by a hinge 40.

On the upper surface of the personal computer body 10 is a keyboard 20, an operating ball 22 and function keys 24. On the rear side of the personal computer body 10 are a slot 30 and connectors 32.

The cover member 50 connected to the personal computer body 10 by the hinge 40 could be supported in a closed position and an open position substantially perpendicular to the body 10. On the inner surface of the cover member 50 which opposes the keyboard 20 when the cover is in a closed position is a first display device 60. The first display device is a liquid crystal display device and the like, and is the same as a LCD display device of a conventional notebook computer.

On the outer surface of the cover member 50 which will face outward when the cover is in a closed position is a second display device 70. The second display device 70 is formed of the same liquid crystal display as the first display device, and will be displayed by the same driving device as the first display device.

Therefore, the same information will be displayed on the first display device 60 and the second display device 70.

When the operator displays a picture on the first display device 60 by operating the keyboard 20 and the like, the same picture will be displayed on the second display device 70. The client positioned facing the operator with the personal computer 1 placed between them will be able to see the picture displayed on the second display device 70.

The operator could face the client watching the same picture on the display and operate the computer by the keyboard 20 and negotiate with the client at the same time.

The operator and the client are both positioned facing the display, so they can share a clear vision of the display.

As is explained above, the notebook computer of the present invention comprises of a display device formed on both the inner surface and the outer surface of the cover member which could be supported in an open position substantially perpendicular to the body 10. Therefore, the screen displayed on the display device facing the operator of the notebook computer could also be displayed on the display device on the outer surface.

By utilizing the present notebook computer, the client facing the operator with the notebook computer placed between them could see the same screen and share information with the operator. Therefore, negotiation between the operator and the client will be smooth.

What is claimed is:

1. A notebook computer comprising:

a notebook computer body having a keyboard;

a cover member fixed to the notebook computer body by a hinge so as to open and close against said notebook computer body;

a first display device formed on the inner surface of the cover member; and a second display device formed on the outer surface of the cover member.

2. The notebook computer of claim 1 wherein the first display device and the second display device show the same information.

* * * * *